United States Patent
Dittmar (10) Patent No.: US 6,504,670 B1
(45) Date of Patent: Jan. 7, 2003

(54) METHOD AND APPARATUS FOR REDUCING OSCILLATIONS EXCITED DURING A SEEK OPERATION IN A DISK DRIVE

(75) Inventor: Mark Dittmar, Westminster, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/345,119

(22) Filed: Jul. 6, 1999

(51) Int. Cl.$^7$ ................................................ G11B 5/596
(52) U.S. Cl. ................................ 360/78.07; 360/78.09; 360/78.04
(58) Field of Search .................... 360/78.04, 78.06, 360/78.07, 78.09, 78.14; 318/560, 611, 615; 369/44.29, 44.28

(56) References Cited

U.S. PATENT DOCUMENTS

| | | | | |
|---|---|---|---|---|
| 5,396,379 A | * | 3/1995 | Mayo | 360/78.07 |
| 5,510,939 A | | 4/1996 | Lewis | 360/78.09 |
| 5,675,558 A | | 10/1997 | Katoh | 369/32 |
| 5,859,742 A | | 1/1999 | Takaishi | 360/78.01 |
| 5,875,066 A | | 2/1999 | Ottesen | 360/77.11 |
| 5,914,829 A | * | 6/1999 | Kadlec et al. | 360/78.09 X |
| 6,178,060 B1 | * | 1/2001 | Liu | 360/78.07 |

OTHER PUBLICATIONS

Singer et al.; "Preshaping Command Inputs to Reduce System Vibration"; *Transactions of the ASME*; vol. 112; Mar. 1990; pp. 76–82.

O.J.M. Smith; "Feedback Control Systems"; McGraw–Hill Book Company; 1958; pp. 331–343.

* cited by examiner

*Primary Examiner*—Andrew L. Sniezek
(74) *Attorney, Agent, or Firm*—Tejpal S. Hansra (57) ABSTRACT

Disk drive access times are reduced by including at least one cancellation impulse in a voice coil motor input signal to effectively cancel oscillations caused by natural resonances in an actuator assembly during a seek operation. Each cancellation impulse has an amplitude and application time that is tailored for optimal cancellation of oscillations. The amplitude and application time are calculated based upon known or estimated characteristics of the natural resonance within the actuator assembly.

21 Claims, 5 Drawing Sheets

| SAMPLE TIME | 0 | 1 | 2 | 3 | 4 | 5 | 6 | 7 |
|---|---|---|---|---|---|---|---|---|
| FEEDFORWARD VALUE | p | 2p | p | 0 | -p | -2p | -p | 0 |
| DISTANCE TO GO | $C_1$ | $C_2$ | $C_3$ | $C_4$ | $C_5$ | $C_6$ | $C_7$ | $C_8$ |

Fig. 7

| SAMPLE TIME | 0 | 0+ | 1 | 1+ | 2 | 2+ | 3 | 3+ | 4 | 4+ | 5 | 5+ | 6 | 6+ | 7 | 7+ |
|---|---|---|---|---|---|---|---|---|---|---|---|---|---|---|---|---|
| FEEDFORWARD VALUE | m | n | m+n | 2n | 2n-m | n | n-m | 0 | -m | -n | -m-n | -2n | m-2n | -n | m-n | 0 |
| DISTANCE TO GO | $C_1$ | | $C_2$ | | $C_3$ | | $C_4$ | | $C_5$ | | $C_6$ | | $C_7$ | | $C_8$ | |

METHOD AND APPARATUS FOR
REDUCING OSCILLATIONS EXCITED
DURING A SEEK OPERATION IN A DISK
DRIVE

FIELD OF THE INVENTION

The invention relates generally to data storage systems and, more particularly, to disk based data storage systems.

BACKGROUND OF THE INVENTION

A disk drive is a data storage device that stores data in concentric tracks on a disk shaped medium. Data is read from the medium by spinning the medium about a central axis while positioning a transducer near a desired track of the medium to sense the data. The transducer provides an electrical signal representative of the sensed data to data processing circuitry within the disk drive which converts the electrical signal to a format that is recognizable by an attached host unit. The converted data signal is then delivered to the host unit for use thereby. Disk drives can store data in any of a number of different forms, such as magnetic data storage and optical data storage.

A seek operation in a disk drive is a process during which the transducer is moved from a present track of the disk to a target track of the disk so that a data transfer with the target track can be performed. A seek operation is generally initiated in response to a read or write request received by the disk drive from the host computer. In the read/write request, the host computer generally specifies the location on the disk (e.g., the track and sector) at which the data transfer is to take place, and the disk drive then moves the transducer to that location. Once the transducer is in position, the requested data transfer to or from the disk is allowed to occur.

Disk access time is a parameter used in the disk drive industry to specify the average time it takes a disk drive to perform a requested data transfer. As such, disk access time is ordinarily used to gauge the performance of individual disk drives with respect to other disk drives. A disk drive having a low disk access time is generally preferred over a disk drive having a higher disk access time because the drive having the lower disk access time, on average, performs read and write operations faster. Consequently, the disk drive having the lower disk access time allows the host computer to perform applications faster. As can be appreciated, the disk access time of a disk drive is directly related to the seek time of the disk drive. That is, a longer seek time will generally result in a longer disk access time.

Therefore, there is a need in the disk drive industry for techniques and devices for reducing seek time in a disk drive.

SUMMARY OF THE INVENTION

The present invention relates to a system that is capable of reducing seek time in a disk drive. In conceiving of the invention, it was appreciated that natural resonances within the actuator assembly of a disk drive are often responsible for significantly increasing the time it takes for a transducer to settle above a target track following a seek operation. The natural resonance of the actuator assembly is excited during the seek operation by impulses that are delivered to the input of the voice coil motor (VCM) of the disk drive. Once excited, the oscillations cause position errors during the seek operation that make it difficult for the transducer to properly follow a desired seek profile. Thus, a large position or velocity error exists at the end of the seek operation that the disk drive must recover from. This extends the period of time before which data transfers with the target track can be carried out.

In accordance with the invention, the control signal delivered to the VCM during a seek operation is modified to include at least one cancellation impulse that is designed to cancel oscillations excited by another impulse in the control signal. Preferably, at least one cancellation impulse is generated for each servo sample time during the seek operation. The cancellation impulse has a magnitude and timing that is related to the frequency and damping characteristics of the natural resonance. In a preferred embodiment of the invention, the cancellation impulse(s) is(are) applied during short seek operations in the disk drive. That is, the position mode tables used by the disk drive to perform short seek operations in the drive are modified to include feedforward components that can be used to generate the cancellation pulses.

DETAILED DESCRIPTION OF A PREFERRED EMBODIMENT

Figure 1:
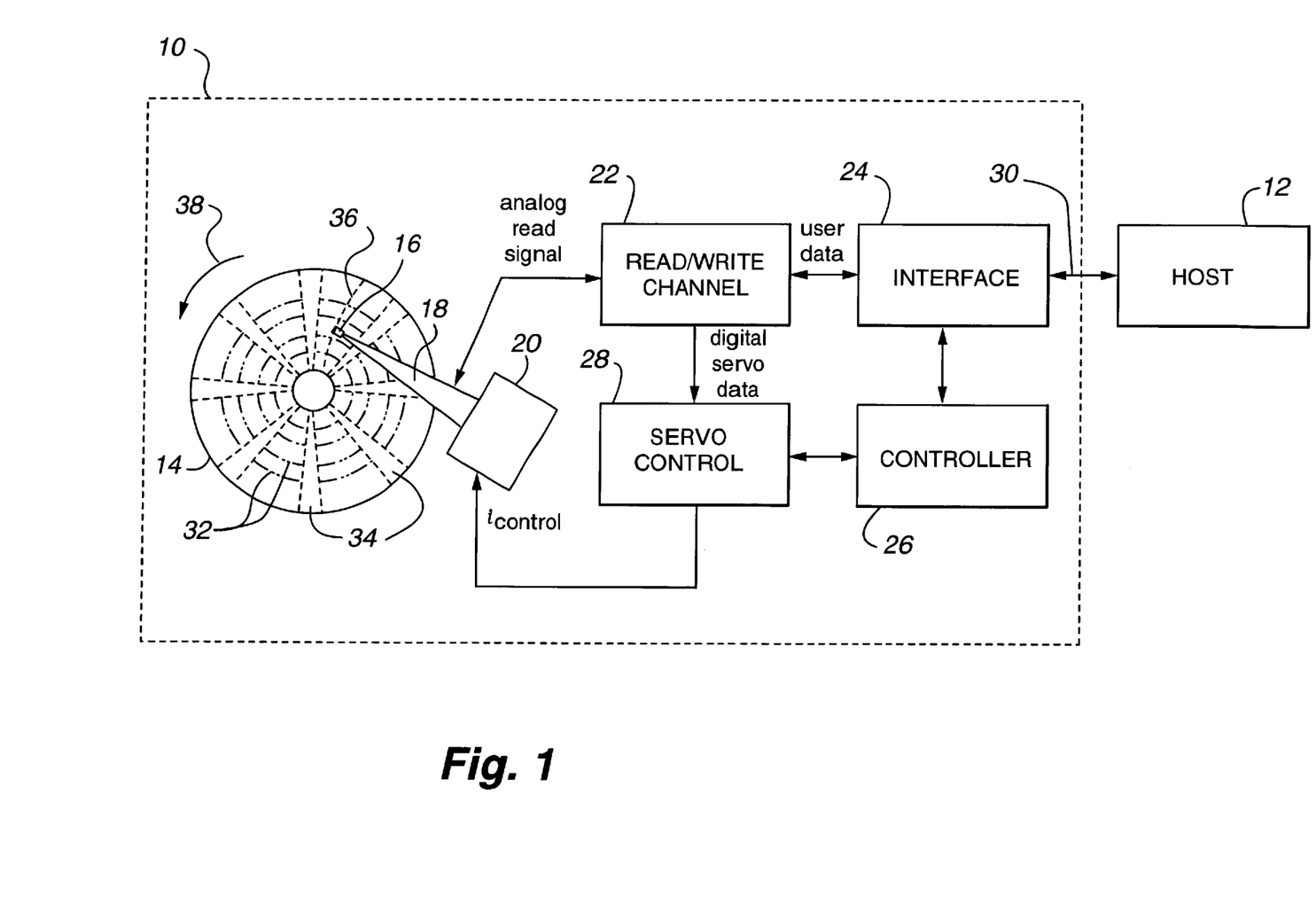
FIG. 1 is a block diagram illustrating a disk drive that can utilize the principles of the present invention.

FIG. 1 is a block diagram illustrating a disk drive 10 that can utilize the principles of the present invention. As illustrated, the disk drive 10 is coupled to an external host computer 12 which uses the disk drive 10 as a mass storage device. The disk drive 10 includes: a data storage disk 14, a transducer 16, an actuator arm 18, a voice coil motor (VCM) 20, a read/write channel 22, an interface 24, a controller 26, and a servo control unit 28. The data storage disk 14 is a disk shaped data storage medium having a magnetic coating disposed upon at least one surface thereof. User data is stored on the magnetic surface of the disk 14 in the form of magnetic polarity transitions. The user data is arranged in a plurality of concentric data storage tracks 32 on the surface of the disk 14. A plurality of radially aligned servo wedges 34 are also provided on the surface of the disk 14 for storing, among other things, servo positioning information. During operation, a spin motor (not shown) spins the disk 14 about a central axis of rotation while data is transferred to (in a write operation) or from (in a read operation) the disk 14.

The transducer 16 is a magnetic field sensor/radiator that is capable of reading data from and writing data to the surface of the disk 14 when held in close proximity thereto. Some disk drives utilize separate transducer elements to perform the reading and writing functions. The actuator arm 18 is a support structure that carries the transducer 16 above the surface of the disk 14. The actuator arm 18 is coupled to the VCM 20 which is operative for imparting rotational motion to the actuator arm 18 to controllably position the transducer 16 above a target track of the disk 14 during read and write operations. In response to an input signal received from the servo control unit 28, the VCM 20 pivots the actuator arm 18 about a pivot point until the transducer 16 is substantially centered above the target track. As the actuator arm 18 pivots about the pivot point, the transducer 16 travels across the surface of the disk 14 along an arc 36.

During normal operation, the disk drive 10 receives read and/or write requests from the host computer 12 via port 30. Each request is received by the interface 24 which converts the request to an appropriate signal format and forwards the request to the controller 26. The controller 26 then carries out the request by appropriately controlling, among other things, the servo control unit 28 and the interface 24. The request from the host 12 typically specifies the location on the surface of the disk 14 to/from which the requested data transfer is to take place. This location is normally specified as a particular track (i.e., the target track) and sector of the disk 14.

The controller 26 instructs the servo control unit 28 to move the transducer 16 to the target track specified in the read/write request. The servo control unit 28 then generates a control signal, $i_{control}$, which it delivers to the VCM 20 to move the transducer 16 from a present location to the target track. This process of moving the transducer 16 from a present location to the vicinity of the target track is known as a seek operation. When the transducer 16 is sufficiently close to the target track, the controller 26 switches the servo control unit 28 to a settle mode during which the transducer 16 settles about the target track. Once the transducer is sufficiently settled, a track following mode is entered during which the transducer 16 is substantially locked onto the target track. It is during this track following mode that the bulk of the requested data transfer is allowed to take place.

As the disk 14 spins, the transducer 16 is continuously reading the servo information in the servo wedges 34 on the surface of the disk 14. This occurs even as the transducer 16 is moving during a seek operation. Because the servo wedges 34 are spaced at equal angles about the disk 14, servo information is generated by the transducer 16 at substantially equal time intervals. Each of the servo wedges 34 includes position information that allows the disk drive 10 to determine the position of the transducer 16 with respect to the disk 14 at the time the particular servo wedge 34 was read (i.e., the corresponding servo sample time). The read/write channel 22 receives the servo data read by the transducer 16 and converts it to a digital representation. The digital servo data is then delivered to the servo control unit 28 which uses the data to generate the control signal, $i_{control}$. Thus, a closed loop feedback system is maintained for positioning the transducer 16 with respect to the disk 14.

The servo wedges 34 on the surface of the disk 14 generally include, among other things, both coarse and fine position information for use in determining a radial position of the transducer 16. The coarse position information generally identifies, using a Gray code, the particular track within which the transducer 16 is located at a corresponding servo sample time. The fine position information generally indicates the radial offset from the track centerline of the transducer 16 at the corresponding servo sample time. Fine position information is typically derived from A, B, C, and D servo bursts within the servo wedges 34. The A and B bursts share a common boundary on the track centerline while the C and D bursts share common boundaries at the half-track locations. As is well known in the art, an accurate indication of a transducer's radial offset from the centerline of a track can be determined by observing the pulse amplitudes generated by the transducer 16 as a result of reading the A, B, C, and D servo bursts.

Figure 2:
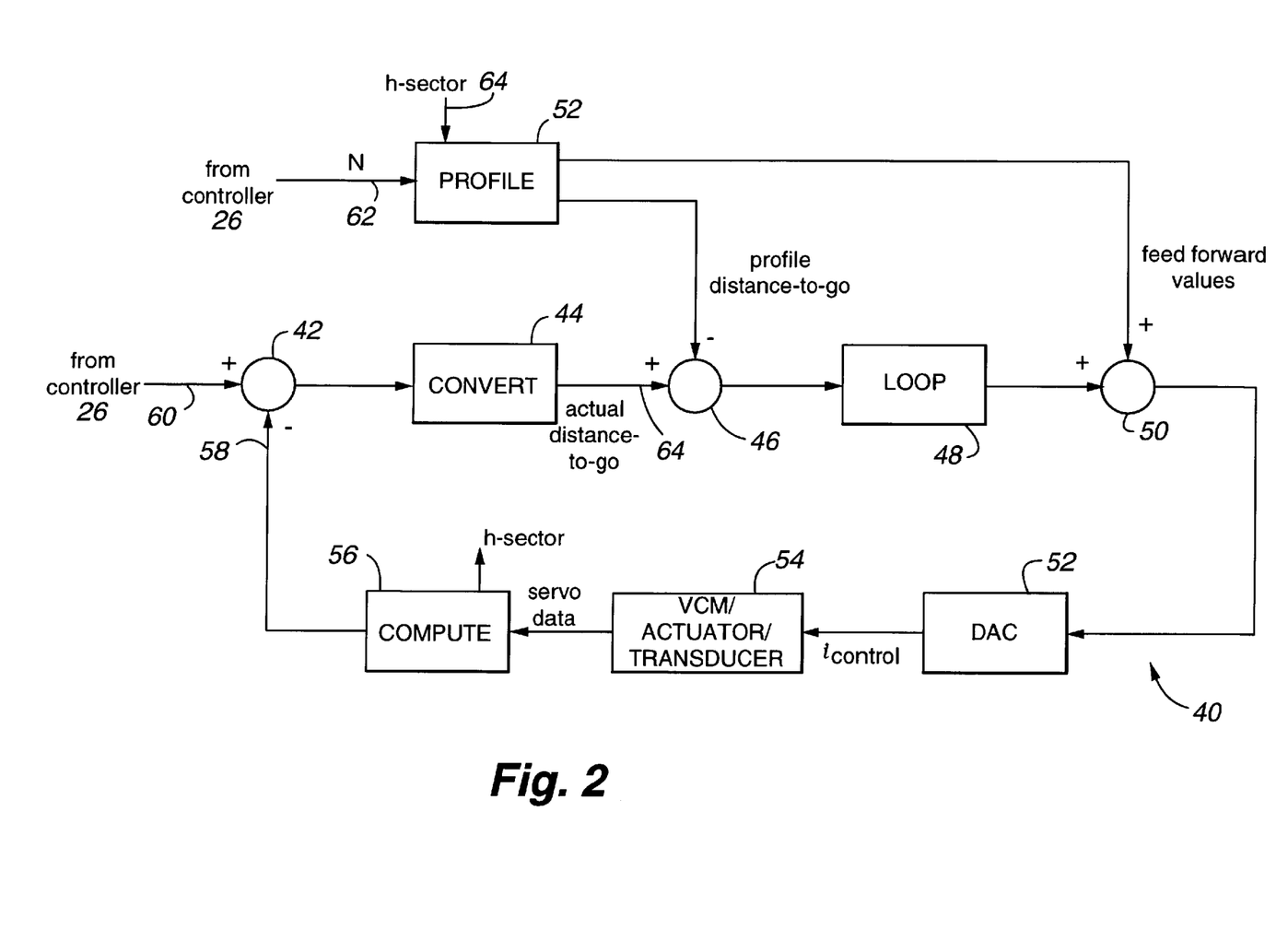
FIG. 2 is a block diagram illustrating a servo control loop that can utilize the principles of the present invention.

FIG. 2 is a block diagram illustrating a servo control loop 40 for use in generating the control signal $i_{control}$ that is delivered to the VCM 20 during a seek operation. The servo control loop 40 of FIG. 2 is operative for performing position mode (PM) seek operations and, therefore, is preferably used during short seek operations in the disk drive 10. Short seek operations are any seeks involving movement of less than a predetermined number of tracks. For example, in one embodiment of the invention, short seeks are any seeks that move the transducer 16 less than 128 tracks. As illustrated in FIG. 2, the servo control loop 40 includes: a first difference unit 42, a conversion unit 44, a second difference unit 46, a loop unit 48, a summation unit 50, a digital-to-analog converter (DAC) 52, a VCM/actuator/transducer 54, a position computation unit 56, and a profile unit 52. In a preferred embodiment, the majority of the functionality within the servo control loop 40 of FIG. 2 is implemented within the servo control unit 28 of FIG. 1. Operation of the servo control loop 40 will be described with reference to FIGS. 1 and 2.

During normal disk drive operation, as described above, the disk drive controller 26 receives a data access request from the host computer 12 specifying a target track from/to which data is to be transferred. The controller 26 then instructs the servo control unit 28 to move the transducer 16 to the target track. However, the type of seek routine that the controller 26 instructs the servo control unit 28 to perform depends upon the total number of tracks that the transducer 16 is to be moved during the seek. As is generally well known, for longer seeks, velocity-based seek routines are usually more efficient while for shorter seeks position-based routines are generally preferred. For each data access request received from the host 12, the controller 26 calculates the number of tracks between the present position of the transducer 16 and the target track. If the number of tracks is less than the predetermined number, the controller 26 decides that a position mode seek operation is to be performed and thus enables the servo control loop 40 of FIG. 2 to control the servo operation.

The servo control loop 40 of FIG. 2 is operative for (a) generating a position-based profile describing how the transducer 16 should move during a particular seek operation and (b) monitoring the position of the transducer 16 during the seek operation to ensure that the profile is being followed. The profile unit 52 is operative for, among other things, generating the seek profile. The seek profile for a position mode seek specifies the position at which the transducer 16 should be at each servo sample time during the seek operation with respect to the target track (i.e., the distance-to-go). The profile unit 52 has access to a plurality of position mode tables from which the seek profiles are developed. Each of the position mode tables corresponds to a specific number of servo samples that are required to perform an associated seek operation. The particular position mode table that is used for a seek depends upon the length of the seek. Thus, for example, if the seek operation has a distance from 10 to 20 tracks, 10 servo samples may be required and a first position mode table is used. If the seek operation has a distance from 21 to 30 tracks, 11 servo samples may be required and a second position mode table is used, and so on.

The controller 26 indicates the number of tracks in the present seek operation, N, to the profile unit 52 via input 62.

Figure 3:
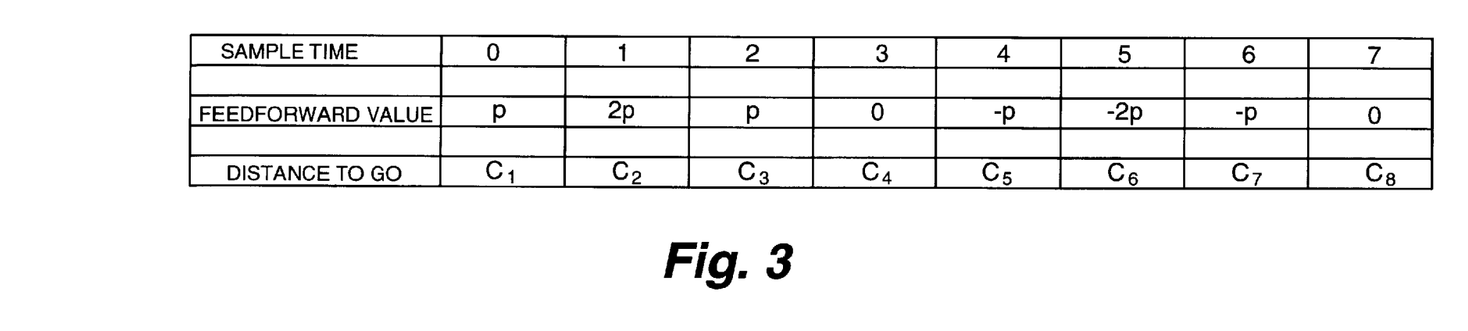
FIG. 3 is a position mode table for use during a position mode seek operation.

The profile unit 52 then selects a position mode table based on the value of N and uses the position mode table to generate the seek profile. Each position mode table indicates: (a) a desired distance-to-go value for each servo sample time during the seek operation, and (b) a feedforward value that will be used for each servo sample time during the seek operation to control acceleration/deceleration of the transducer 16 during the seek. FIG. 3 illustrates a possible position mode table for an 8 servo sample seek. The distance-to-go values, $C_1, C_2, \ldots, C_8$, represent the desired distance between the transducer 16 and the target track at each of the 8 servo sample times during the seek operation. As will be described in more detail, if the transducer 16 strays from the profile during the seek operation, appropriate corrections are made within the loop 40. Typically, both the feedforward values and the distance-to-go values in each position mode table are normalized to a single track and, therefore, must be multiplied by the number of tracks in the present seek operation to generate the seek profile.

During the seek operation, the profile unit 52 receives an h-sector pulse for each servo sample time. In response, the profile unit 52 outputs the distance-to-go value from the seek profile corresponding to that servo sample time to the second difference unit 46. In addition, the profile unit 52 outputs the feedforward value corresponding to that servo sample time to the summation unit 50.

After the servo loop 40 has been enabled by the controller 26, the controller 26 delivers position information to the first difference unit 42, via input 60, that identifies the location of the target track. As described previously, the transducer 16 is continuously reading servo information from the disk 14 including both a coarse indication of present transducer location and a fine indication of present transducer location. With reference to FIG. 2, this information is output by the VCM/actuator/transducer 54 and delivered to the computation unit 56. For each servo sample, the computation unit 56 combines the coarse and fine servo data to form an absolute position indication for the transducer 16 with respect to the disk 14. The computation unit 56 requires a finite amount of time, known as the computation delay, to calculate the absolute position indication. After computation is complete, the computation unit 56 delivers the absolute position indication to the first difference unit 42 and outputs an h-sector pulse to the profile unit 52 indicating that a servo sample has occurred.

The first difference unit 42 subtracts the absolute position indication of the transducer 16 (received from the computation unit 56 at input 58) from the position of the target track (received from the controller 56 at input 60) to determine an actual distance-to-go value which is transferred to the conversion unit 44. The conversion unit 44 converts the actual distance-to-go value to a digital format compatible with the distance-to-go information in the seek profile generated by the profile unit 52. The converted actual distance-to-go value for the present servo sample is then delivered to input 64 of the second difference unit 46. The second difference unit 46 subtracts the desired distance-to-go value from the actual distance-to-go value to form a distance-to-go error value, which it outputs to the loop unit 48. The distance-to-go error value indicates how far the transducer 16 is from the desired profile position at the corresponding sample time and is preferably small. This value is used to compensate for the error by modifying the input signal to the VCM.

The loop unit 48 converts the distance-to-go error value to a digital data format compatible with the feedforward values in the seek profile of the profile unit 52. The summation unit 50 adds the feedforward value for the most recent servo sample to the converted distance-to-go error value to produce a digital control value that is delivered to the DAC 52. The DAC 52 converts the digital control value to an analog control current which is delivered to the input of the VCM/actuator/transducer 54 to control the movement of the transducer in accordance with the position mode profile.

Figure 4:
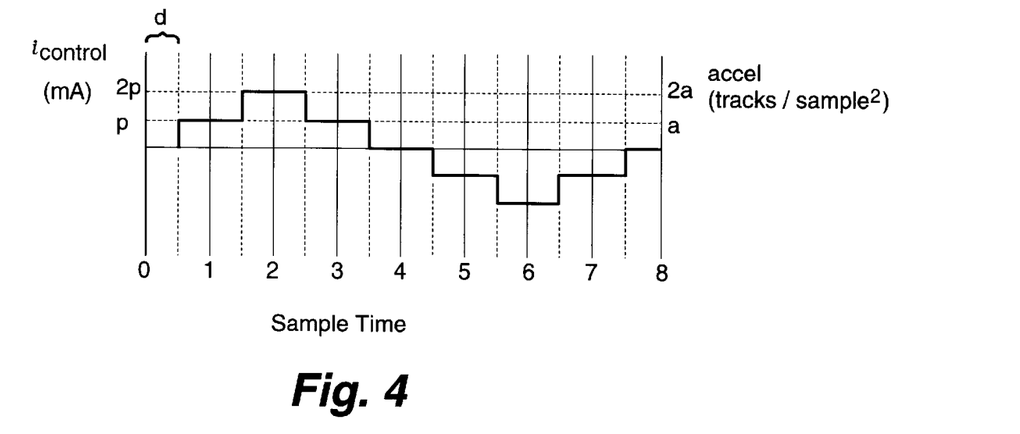
FIG. 4 is a waveform diagram illustrating a voice coil motor input control current corresponding to the position mode table of FIG. 3.

FIG. 4 is a graph illustrating an analog control current signal for delivery to the VCM 20 for an 8 sample-time position mode seek operation. The waveform corresponds to the position mode table of FIG. 3 and assumes little or no distance-to-go error during the seek operation. Because the acceleration of the transducer 16 across the surface of the disk 14 is substantially proportional to the current delivered to the VCM 20, the vertical axis of the graph in FIG. 4 can represent either acceleration or current. Ideally, each of the steps in the current waveform would occur at the corresponding servo sample time. However, because of the computation delay in the computation unit 56, the steps are each delayed by a predetermined amount, d. The flat horizontal portions of the current waveform of FIG. 4 correspond to the feedforward values from the associated seek profile (i.e., the feedforward values from the table of FIG. 3 multiplied by the number of tracks in the seek).

As illustrated in FIG. 4, for each servo sample time in the position mode seek operation, the VCM 20 receives a current impulse (e.g., a rising or falling edge of a step function) at an input thereof. As is generally well known, because of its abrupt nature, an impulse is an inherently broadband signal component. Therefore, if any mechanical resonances exist within the VCM 20 or the actuator arm 18, it is likely that the resonance will be excited by a current impulse delivered to the VCM 20, thereby resulting in undesired oscillations. In conceiving of the present invention, it was appreciated that mechanical oscillations in the actuator assembly can significantly increase the time it takes for the transducer 16 to move to and settle upon the target track during read and write operations. To reduce the negative effects of such oscillations, it was determined that the control signal applied to the VCM 20 during the seek operation could be modified to suppress undesired oscillations as they occur. That is, a cancellation impulse can be applied to the VCM 20 after a primary impulse is applied to cancel the oscillations excited by the primary impulse.

In accordance with a preferred embodiment of the present invention, the profile unit 52 and the position mode tables are modified so that two (or possibly more) feedforward values are output by the profile unit 52 for each servo sample, rather than a single value. The second feedforward value is operative for canceling any spurious mechanical oscillations excited by the first feedforward value. The first feedforward value is output by the profile unit 52 in response to receipt of an h-sector pulse from the computation unit 56, as before. The second feedforward value is output by the profile unit 52 a predetermined period of time after the first feedforward value, but before a next h-sector pulse is received. As will be described in greater detail below, the magnitudes of the first and second feedforward values and the period of time between the injection of the first and second feedforward values into the seek control loop 40 are calculated to achieve optimal cancellation.

To determine the first and second feedforward values and the time period between injection of the values into the servo loop 40, the expected resonance within the drive must be characterized. In its simplest form, the invention assumes that there is a single dominant mechanical resonance in the actuator assembly. The single resonance is assumed to be a second order, damped resonance having the following transfer function:

$$H(s) = \omega_r^2/(s^2 + 2z\omega_r + \omega_r^2)$$

where $\omega_r$ is the resonance frequency and z is the damping factor. In any particular implementation, the resonance frequency and the damping factor can be determined by measurement and/or estimation. For example, in one embodiment, the resonance frequency is obtained by performing one or more short seeks in the disk drive while monitoring the position error signal (PES). A fast Fourier transform (FFT) is then performed on the PES signal after the servo system switches to settle mode and the dominant frequency component is noted. Damping factor estimates can be made, for example, by comparing the settle characteristics of the disk drive with a mathematical model of a second order damped system.

Figure 5:
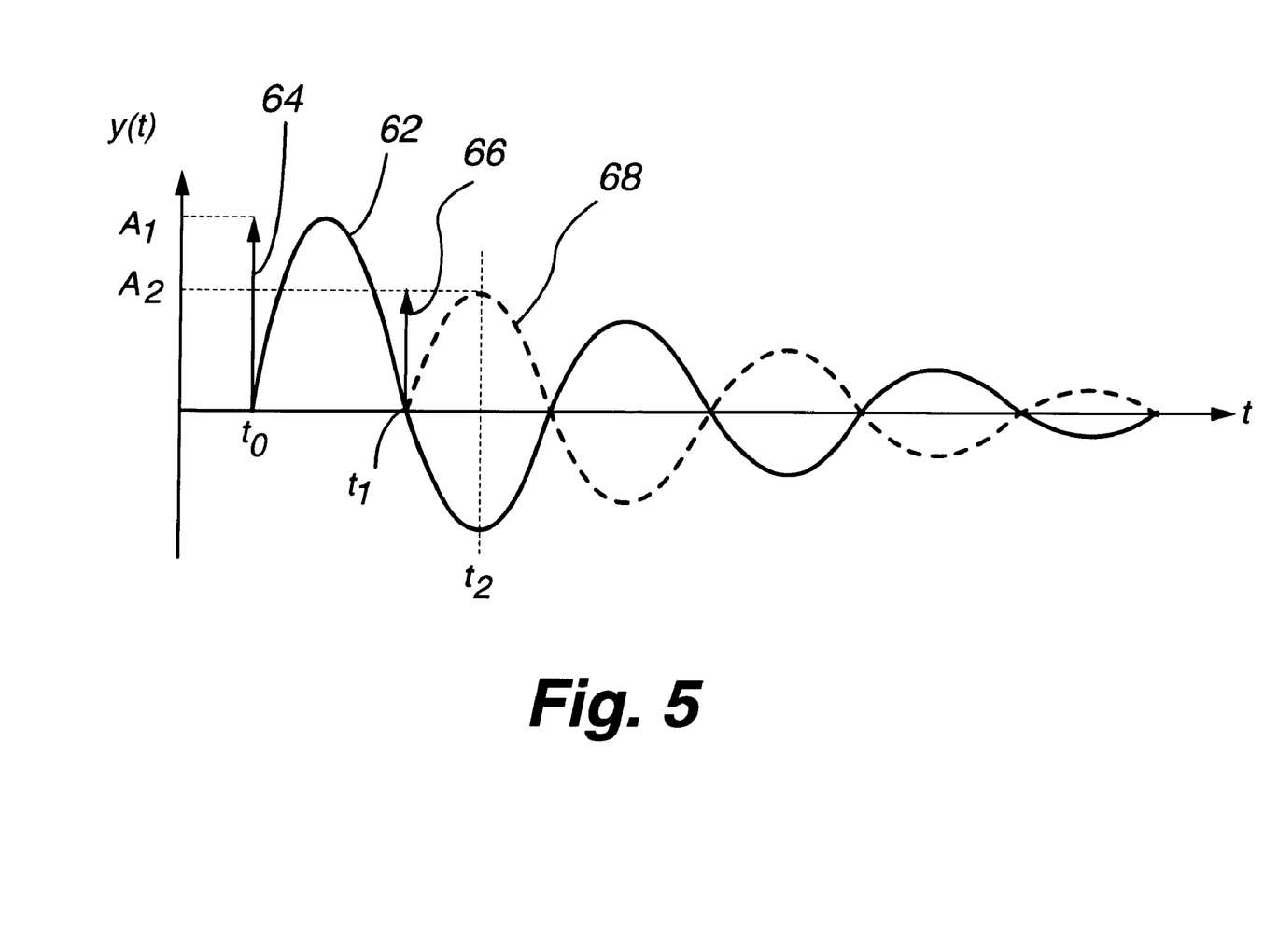
FIG. 5 is a diagram illustrating a pair of impulse responses that are generated in accordance with the present invention.

The time domain impulse response of a second order damped resonance having the above transfer function is:

$$y(t) = \left[A \frac{\omega_r}{\sqrt{1-z^2}} e^{-z\omega_r(t-t_0)}\right] \sin\left(\omega_r \sqrt{1-z^2}\,(t-t_0)\right)$$

where A is the amplitude of the impulse, t is time, and $t_0$ is the time of the impulse input. FIG. 5 is a graph illustrating a first impulse response 62 resulting from a first impulse 64 applied at time to (which is assumed to be t=0 in the following discussion). The first impulse response 62 is a damped sine function that first crosses the zero axis at:

$$t_1 = \frac{\pi}{\omega_r \sqrt{1-z^2}}.$$

As shown in FIG. 5, if a second impulse 66 having an appropriate amplitude $A_2$ is input at time $t_1$, then a second impulse response 68 results that is equal in magnitude to, but opposite in polarity from, the first impulse response 62 for any point in time after $t_1$. Thus, the second impulse response 68 cancels the first impulse response 62.

For optimal cancellation to occur, the magnitude of the second impulse response 68 must be equal and opposite to the magnitude of the first impulse response 62 at any particular time. The first impulse response 62 reaches a first negative maximum at:

$$t_2 = \frac{3\pi}{2\omega_r \sqrt{1-z^2}}$$

At time $t=t_2$, the magnitude of the first impulse response 62 is:

$$y_1(t_2) = -A_1 \frac{\omega_r}{\sqrt{1-z^2}} e^{-z \frac{3\pi}{2\sqrt{1-z^2}}}$$

where $y_1(t)$ is the first impulse response 62 and $A_1$ is the amplitude of the first impulse 64. Thus, the magnitude of the second impulse response 68 at $t=t_2$ should be:

$$y_2(t_2) = A_1 \frac{\omega_r}{\sqrt{1-z^2}} e^{-z \frac{3\pi}{2\sqrt{1-z^2}}}$$

The impulse response equation gives the magnitude of the second impulse response 68 at $t=t_2$ as:

$$y_2(t_2) = A_2 \frac{\omega_r}{\sqrt{1-z^2}} e^{-z\omega_r\left(\frac{\pi}{2\omega_r\sqrt{1-z^2}}\right)}$$

where $A_2$ is the amplitude of the second impulse 66. Setting these two equations equal to one another gives the following relationship between the amplitude of the second impulse 66 and the amplitude of the first impulse 64:

$$A_2 = A_1 e^{\frac{-\pi z}{\sqrt{1-z^2}}}$$

Therefore, if a first impulse having an amplitude $A_1$ is applied at $t=t_0$ and a second impulse having an amplitude $A^1 e^{-\pi z/\sqrt{1-z^2}}$ is applied $\pi/\omega_r\sqrt{1-z^2}$ later, then, ideally, all resulting oscillations will cancel. In practice, total cancellation will not be achieved because the damping factor and the resonant frequency are only estimated and because one or more secondary resonances may also exist. However, a significant reduction in overall oscillation can be obtained.

Referring back to FIG. 2, the first current step in the control signal $i_{control}$ applied to the VCM/actuator/transducer 54 for a particular servo sample time acts as the first impulse 64 described above. Therefore, in accordance with one embodiment of the invention, a second current step, corresponding to the second impulse 66 described above, is applied to the VCM/actuator/transducer 54 for each servo sample time to reduce oscillations excited by the first current step. The second current step occurs $\pi/\omega_r\sqrt{1-z^2}$ seconds after the first current step and has an amplitude that is less than the amplitude of the first current step by a factor of $e^{-\pi z/\sqrt{1-z^2}}$. As can be appreciated, the above cancellation technique can only be used if the second current step occurs before the next servo sample pulse.

Figure 6:
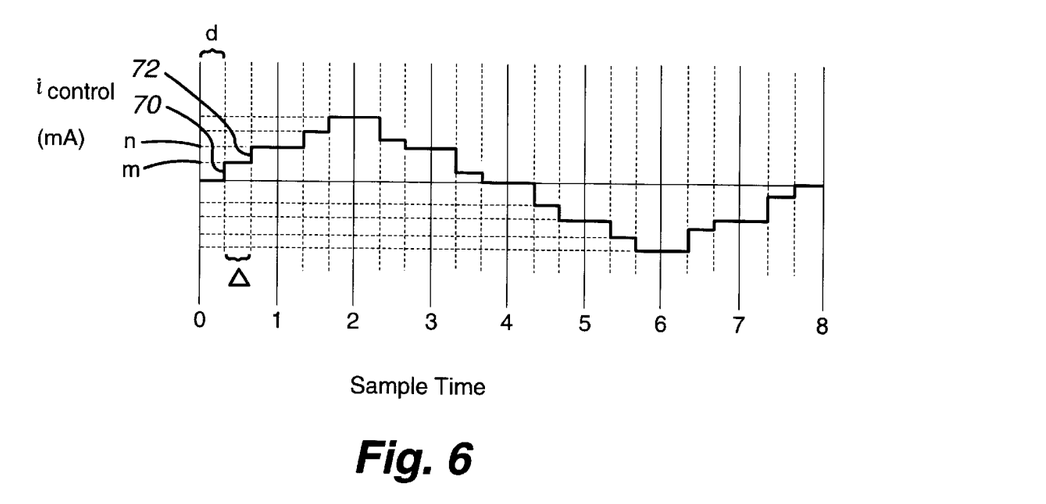
FIG. 6 is a waveform diagram illustrating an input control current for delivery to a voice coil motor in accordance with the present invention.

FIG. 6 illustrates a current waveform in accordance with the above-described cancellation technique for an eight sample time seek. As with the current waveform of FIG. 4, the waveform of FIG. 6 assumes little or no distance-to-go error during the seek operation. After a sample is read at sample time 0, a first current step 70 occurs after a delay d. This is the same computation delay d that was described with respect to FIG. 4. The first current step 70 brings the input current from a level of zero milliamps to a level of m milliamps. After a second time delay $\Delta$, a second step 72 occurs which brings the current from a level of m milliamps to a level of n milliamps. Thus, the amplitude of the second step 72 is n minus m. In accordance with one embodiment of the invention, the following relationships apply:

$$\Delta = \frac{\pi}{\omega_r\sqrt{1-z^2}}, \text{ and}$$

$$n - m = (m - 0) e^{-\pi z/\sqrt{1-z^2}}$$

As illustrated, similar relationships apply for the other servo sample times in the seek.

In one embodiment of the present invention, the position mode tables accessed by the profile unit 52 (see FIG. 2) are modified to generate control signals such as the one illustrated in FIG. 6. That is, the amplitudes of the feedforward values in the position mode tables are changed and additional feedforward values are added for each of the servo sample times in the seek. The profile unit 52 is also modified so that the second feedforward value for each servo sample time is output to the summation unit 50 at the appropriate time after the first feedforward value. In one approach, a countdown timer is implemented within the profile unit 52 for controlling the injection of the second feedforward value. The timer starts to run when the first feedforward value is injected and, when it times out, the second feedforward value is injected. The timer is then reset for the next servo sample interval. Other approaches for injecting the second feedforward value are also possible.

Figure 7:
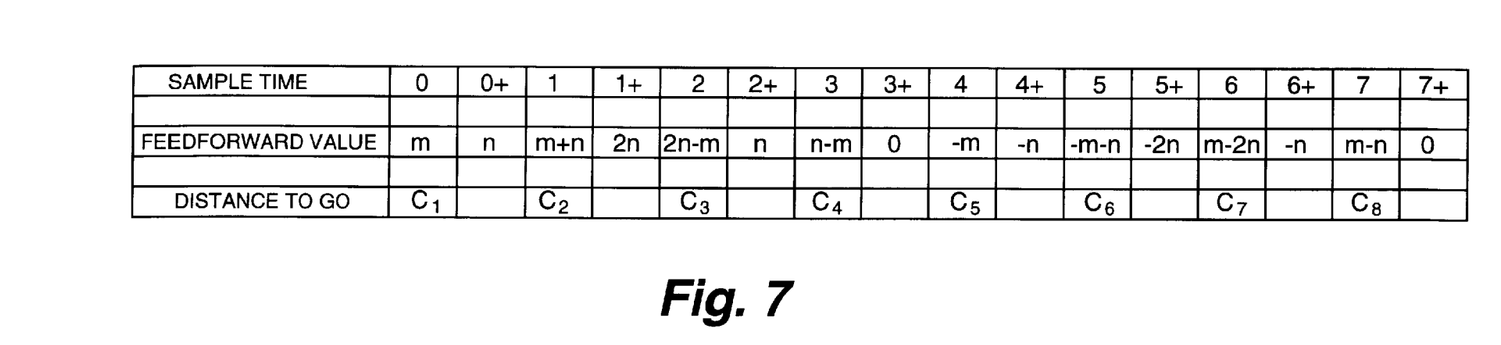
FIG. 7 is a position mode table that can be used to generate the input control current of FIG. 6.

FIG. 7 illustrates a position mode table that can be used to generate the current waveform of FIG. 6 in accordance with the present invention. For illustration purposes, the feedforward values in the table of FIG. 7 are in terms of constants m and n introduced in connection with FIG. 6 to describe the current waveform. It should be appreciated, however, that the actual digital values stored in the position mode table would have to be multiplied by an appropriate constant and converted to analog form to achieve the required current signal. In addition, it should be understood that position-to-go errors in the servo loop 40 may modify the current waveform of FIG. 6 during actual disk drive operation.

The principles discussed above can be extended to situations where more than one dominant resonance exists within the actuator assembly by utilizing additional (more than two) impulses during each servo sample interval. The only limitation being that all of the cancellation impulses corresponding to a particular servo sample interval must be injected before a subsequent h-sector pulse occurs. In addition, servo systems can be implemented in accordance with the present invention that generate cancellation impulses at less than all of the servo sample intervals in the seek operation. For example, in one embodiment, cancellation impulses are only generated for the servo sample intervals toward the end of the seek operation.

Although the present invention has been described in conjunction with its preferred embodiments, it is to be understood that modifications and variations may be resorted to without departing from the spirit and scope of the invention as those skilled in the art readily understand. For example, the invention can be used in disk drives utilizing virtually any servoing scheme, including drives using a dedicated servo surface, constant linear density arrangements, zoned servo configurations, split data sector servo schemes, and others. In addition, as will be apparent to persons of ordinary skill in the art, methods for generating cancellation pulses other than those utilizing a position mode table approach can be used in accordance with the present invention. Such modifications and variations are considered to be within the purview and scope of the invention and the appended claims.

What is claimed is:

1. A method for use in suppressing oscillations during a seek mode in a disk drive, said method comprising the steps of:

providing a disk drive including a data storage disk having a plurality of substantially concentric tracks and a plurality of servo sectors within each track, a spin motor for rotating said data storage disk about an axis, a transducer for use in transferring data between a track of said data storage disk and an exterior environment, and an actuator assembly coupled to said transducer for use in moving the transducer with respect to the data storage disk, said actuator assembly including an actuator arm that is coupled at one end to said transducer and at another end to a motor unit for controllably moving said actuator arm in response to a control signal applied to said motor unit, wherein said actuator assembly includes a resonance which causes said actuator assembly to oscillate at a predetermined resonance frequency when said resonance is excited;

receiving a seek command to move said transducer from a present position to a destination position proximate to a target track of said data storage disk to enable a data transfer between said transducer and said target track; and generating a control signal for delivery to said motor unit, in response to receipt of said seek command, based upon said predetermined resonance frequency of said resonance, wherein said step of generating includes generating a first impulse and generating a second impulse, said second impulse being generated a predetermined length of time after said first impulse, wherein said predetermined length of time is inversely proportional to an estimate of said predetermined resonance frequency.

2. The method, as claimed in claim 1, further comprising the step of:

estimating a damping factor of said resonance, wherein said step of generating includes generating said control signal based upon said estimated damping factor of said resonance.

3. The method, as claimed in claim 1, wherein:

said step of generating a first impulse includes injecting a first feedforward value into a servo control loop in response to receipt of a signal indicating that a servo sector has been read.

4. The method, as claimed in claim 3, wherein:

said step of generating a second impulse includes injecting a second feedforward value into said servo control loop said predetermined length of time after said first impulse.

5. In a disk drive having a data storage disk, a transducer for transferring data between the data storage disk and an exterior environment, an actuator arm for holding the transducer proximate to a surface of the data storage disk, and a motor unit coupled to the actuator arm for use in controllably moving the transducer with respect to the surface of the data storage disk, a method for reducing the effects of a mechanical resonance in the disk drive during a seek operation comprising the steps of:

applying a first electrical impulse to the motor unit to facilitate motion of the transducer toward a target track of the data storage disk, said first electrical impulse exciting the mechanical resonance which causes oscillations at a first resonance frequency within the disk drive; and applying a second electrical impulse to said motor unit after said first electrical impulse, said second electrical impulse having an amplitude and being applied at a time that significantly reduces the oscillations excited by said first electrical impulse, wherein said second electrical impulse is applied to said motor unit an amount of time t after said first electrical impulse, wherein t is determined based upon the following equation:

$$t = \frac{\pi}{\omega_r \sqrt{1-z^2}}$$

where $\omega_r$ is the first resonance frequency of said mechanical resonance and z is an oscillation damping factor of said mechanical resonance.

6. The method, as claimed in claim 5, wherein:

said second electrical impulse excites second oscillations that cancel oscillations excited by said first electrical impulse.

7. The method, as claimed in claim 5, wherein:

said amplitude of said second electrical impulse is determined based upon the following equation:

$$A_2 = A_1 e^{\frac{-\pi z}{\sqrt{1-z^2}}}$$

where $A_2$ is the amplitude of the second electrical impulse, $A_1$ is the amplitude of the first electrical impulse, and z is the oscillation damping factor of said mechanical resonance.

8. The method, as claimed in claim 5, wherein:

said steps of applying first and second electrical impulses are repeated for multiple servo samples taken during the seek operation.

9. The method, as claimed in claim 5, wherein:

said first and second electrical impulses comprise current steps in a current signal applied to said motor unit.

10. A disk drive comprising:

at least one data storage disk having a plurality of substantially concentric tracks and a plurality of servo sectors within each track;

a spin motor for rotating said data storage disk about an axis; a transducer for use in transferring data between a track of said data storage disk and an exterior environment;

an actuator assembly coupled to said transducer for use in moving said transducer to a desired track of said data storage disk to perform a data transfer with the desired track, said actuator assembly including an actuator arm for supporting said transducer and a motor unit for controllably moving said actuator arm in response to a control signal applied to said motor unit, wherein said actuator assembly includes a resonance which causes said actuator assembly to oscillate when an impulse is applied to said motor unit; and a servo unit for generating said control signal, said control signal including first and second impulses for each servo sample time during a seek operation, wherein a delay between said first and said second impulses applied to said motor unit during each servo sample time is based upon a frequency of said resonance of said actuator assembly.

11. The disk drive, as claimed in claim 10, wherein:

said control signal comprises a current signal that is applied to said motor unit and said first and second impulses comprise steps in said current signal.

12. The disk drive, as claimed in claim 10, wherein:

said servo unit includes a profile unit and a servo control loop, said profile unit for generating a seek profile based upon a number of tracks in said seek operation, said seek profile having a plurality of feedforward values for injection into said servo control loop during said seek operation, wherein said servo unit injects as least two of said plurality of feedforward values into said servo control loop for each servo sample time during said seek operation, a first of said at least two feedforward values corresponding to said first impulse and a second of said at least two feedforward values corresponding to said second impulse.

13. A disk drive comprising:

a data storage disk having a plurality of substantially concentric tracks and a plurality of servo sectors within each track;

a spin motor for rotating said data storage disk about an axis;

a transducer for use in transferring data between a track of said data storage disk and an exterior environment;

an actuator assembly coupled to said transducer, said actuator assembly including an actuator arm for supporting said transducer and a motor unit for controllably moving said actuator arm with respect to said data storage disk in response to a control signal applied to said motor unit, wherein said actuator assembly includes a resonance which causes said actuator assembly to oscillate when an impulse is applied to said motor unit; and a servo unit for generating said control signal to move said transducer from a present location to a location proximate to a target track of said data storage disk during a seek operation, said servo unit including a profile generator for generating a seek profile describing a desired motion of said transducer during said seek operation, said seek profile including a plurality of feedforward values for injection into a servo control loop during said seek operation, said plurality of feedforward values including at least two feedforward values for each servo sample time during said seek operation, wherein said servo unit injects a first of said at least two feedforward values into said servo control loop in response to a servo sample pulse and a second of said at least two feedforward values into said servo control loop a predetermined time after said first value is injected, wherein said predetermined period of time is related to a frequency of said resonance in said actuator assembly.

14. The disk drive, as claimed in claim 13, wherein:

said resonance in said actuator assembly includes a damping factor z describing an attenuation over time of oscillations caused by said resonance, wherein said predetermined time is related to said damping factor.

15. The disk drive, as claimed in claim 14, wherein:

said predetermined time is determined based upon the following equation:

$$t = \frac{\pi}{\omega_r \sqrt{1-z^2}}$$

where $\omega_r$ is said frequency of said resonance and z is the damping factor of said resonance.

16. The disk drive, as claimed in claim 14, wherein:

said second of said at least two feedforward values is calculated based upon said first of said at least two feedforward values and said damping factor.

17. In a disk drive having a data storage disk, a transducer for transferring data between the data storage disk and an exterior environment, an actuator arm for holding the transducer proximate to a surface of the data storage disk, and a motor unit coupled to the actuator arm for use in controllably moving the transducer with respect to the surface of the data storage disk, a method for reducing the effects of a mechanical resonance in the disk drive during a seek operation comprising the steps of:

applying a first electrical impulse to the motor unit to facilitate motion of the transducer toward a target track of the data storage disk, said first electrical impulse exciting the mechanical resonance which causes oscillations at a first resonance frequency within the disk drive; and applying a second electrical impulse to said motor unit after said first electrical impulse, said second electrical impulse having an amplitude and being applied at a time that significantly reduces the oscillations excited by said first electrical impulse, wherein said amplitude of said second electrical impulse is determined based upon the following equation:

$$A_2 = A_1 e^{\frac{-\pi z}{\sqrt{1-z^2}}}$$

where $A_2$ is the amplitude of the second electrical impulse, $A_1$ is the amplitude of the first electrical impulse, and z is the oscillation damping factor of said mechanical resonance.

18. The method, as claimed in claim 17, wherein:

said steps of applying first and second electrical impulses are repeated for multiple servo samples taken during the seek operation.

19. In a disk drive having a data storage disk, a transducer for transferring data between the data storage disk and an exterior environment, an actuator arm for holding the transducer proximate to a surface of the data storage disk, and a motor unit coupled to the actuator arm for use in controllably moving the transducer with respect to the surface of the data storage disk, a method for reducing the effects of a mechanical resonance in the disk drive during a seek operation comprising the steps of:

applying a first electrical impulse to the motor unit to facilitate motion of the transducer toward a target track of the data storage disk, said first electrical impulse exciting the mechanical resonance which causes oscillations at a first resonance frequency within the disk drive; and applying a second electrical impulse to said motor unit after said first electrical impulse, said second electrical impulse having an amplitude and being applied at a time that significantly reduces the oscillations excited by said first electrical impulse, wherein said steps of applying first and second electrical impulses are repeated for multiple servo samples taken during the seek operation.

20. In a disk drive having a data storage disk, a transducer for transferring data between the data storage disk and an exterior environment, an actuator arm for holding the transducer proximate to a surface of the data storage disk, and a motor unit coupled to the actuator arm for use in controllably moving the transducer with respect to the surface of the data storage disk, a method for reducing the effects of a mechanical resonance in the disk drive during a seek operation comprising the steps of:

applying a first electrical impulse to the motor unit to facilitate motion of the transducer toward a target track of the data storage disk, said first electrical impulse exciting the mechanical resonance which causes oscillations at a first resonance frequency within the disk drive; and applying a second electrical impulse to said motor unit after said first electrical impulse, said second electrical impulse having an amplitude and being applied at a time that significantly reduces the oscillations excited by said first electrical impulse, wherein the seek operation has an acceleration stage and a deceleration stage and wherein the second electrical impulse is applied during the acceleration stage of the seek operation.

21. A method for use in suppressing oscillations during a seek mode in a disk drive, said method comprising the steps of:

providing a disk drive including a data storage disk having a plurality of substantially concentric tracks and a plurality of servo sectors within each track, a spin motor for rotating said data storage disk about an axis, a transducer for use in transferring data between a track of said data storage disk and an exterior environment, and an actuator assembly coupled to said transducer for use in moving the transducer with respect to the data storage disk, said actuator assembly including an actuator arm that is coupled at one end to said transducer and at another end to a motor unit for controllably moving said actuator arm in response to a control signal applied to said motor unit, wherein said actuator assembly includes a resonance which causes said actuator assembly to oscillate at a predetermined resonance frequency when said resonance is excited;

receiving a seek command to move said transducer from a present position to a destination position proximate to a target track of said data storage disk to enable a data transfer between said transducer and said target track; and generating a control signal for delivery to said motor unit, in response to receipt of said seek command, based upon said predetermined resonance frequency of said resonance, wherein said step of generating includes generating a first impulse and a second impulse, wherein the second impulse is generated after the first impulse, wherein said second impulse significantly reduces oscillations of said actuator arm assembly, wherein the control signal has an acceleration stage and a deceleration stage, and wherein the second electrical impulse is applied during the acceleration stage of the control signal.

* * * * *